United States Patent
Kong et al.

(10) Patent No.: US 6,700,263 B1
(45) Date of Patent: Mar. 2, 2004

(54) ELECTRICAL GENERATING SYSTEM HAVING A MAGNETIC COUPLING

(76) Inventors: Carl Cheung Tung Kong, 6122 Whittier Blvd., Los Angeles, CA (US) 90022; John Kong, 6122 Whittier Blvd., Los Angeles, CA (US) 90022

( * ) Notice: Subject to any disclaimer, the term of this patent is extended or adjusted under 35 U.S.C. 154(b) by 34 days.

(21) Appl. No.: 10/213,570

(22) Filed: Aug. 6, 2002

(51) Int. Cl.[7] .......................... H03P 15/00; H02K 49/00
(52) U.S. Cl. ..................... 310/103; 310/75 D; 310/92; 310/99; 310/113; 310/112; 290/1 R; 290/1 C; 290/38 R; 74/333
(58) Field of Search ................................ 310/112, 113, 310/40 MM, 74, 83, 103, 99, 75 D, 92, 75 R, 78; 290/38 R, 1 C, 1 R, 1 G; 74/333

(56) References Cited

U.S. PATENT DOCUMENTS

| | | | | |
|---|---|---|---|---|
| 3,860,844 A | * | 1/1975 | Hetzel | 310/104 |
| 4,718,233 A | * | 1/1988 | Barrett | 290/1 R |
| 6,054,788 A | * | 4/2000 | Dombrovski et al. | 310/103 |
| 6,118,194 A | * | 9/2000 | Kawamura | 310/75 R |
| 6,240,890 B1 | * | 6/2001 | Abthoff et al. | 290/38 R |
| 6,252,317 B1 | * | 6/2001 | Scheffer et al. | 310/46 |
| 6,304,002 B1 | * | 10/2001 | Dehlsen et al. | 290/1 C |
| 6,433,450 B1 | * | 8/2002 | Chao | 310/113 |

* cited by examiner

Primary Examiner—Burton S. Mullins
Assistant Examiner—Yahveh Comas
(74) Attorney, Agent, or Firm—Kelly Bauersfeld Lowry & Kelley, LLP

(57) ABSTRACT

An electrical generating system including an electric motor coupled to a power source, such as a solar panel array. A magnetic coupling is connected to an output shaft of the motor. The magnetic coupling includes opposed first and second plates each having permanent magnets affixed thereto and arranged such that rotation of the first plate by the motor causes the second plate to rotate by repulsive magnetic force. A gear assembly having a high transmission ratio is connected to the magnetic coupling. Preferably, at least one electrical generator is connected to the gear assembly for generating electricity.

14 Claims, 3 Drawing Sheets

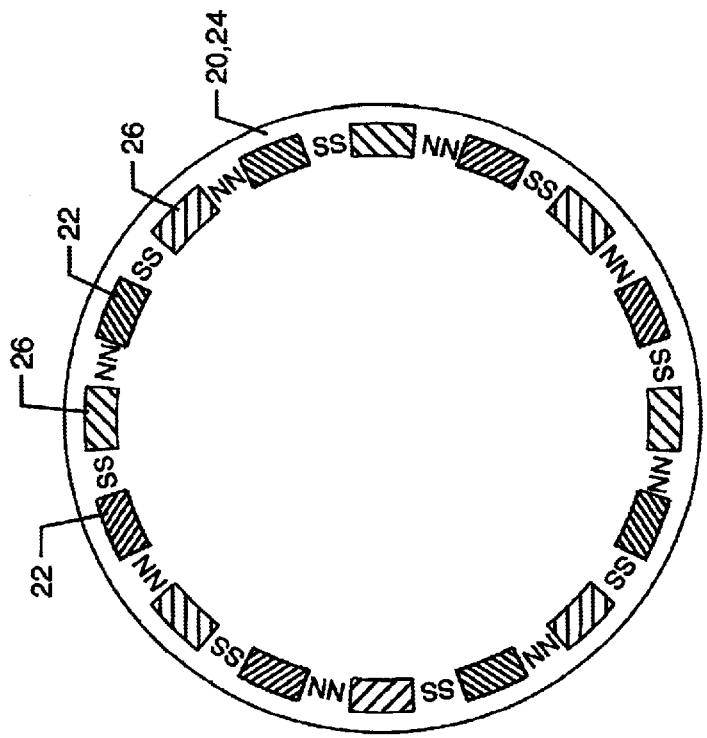
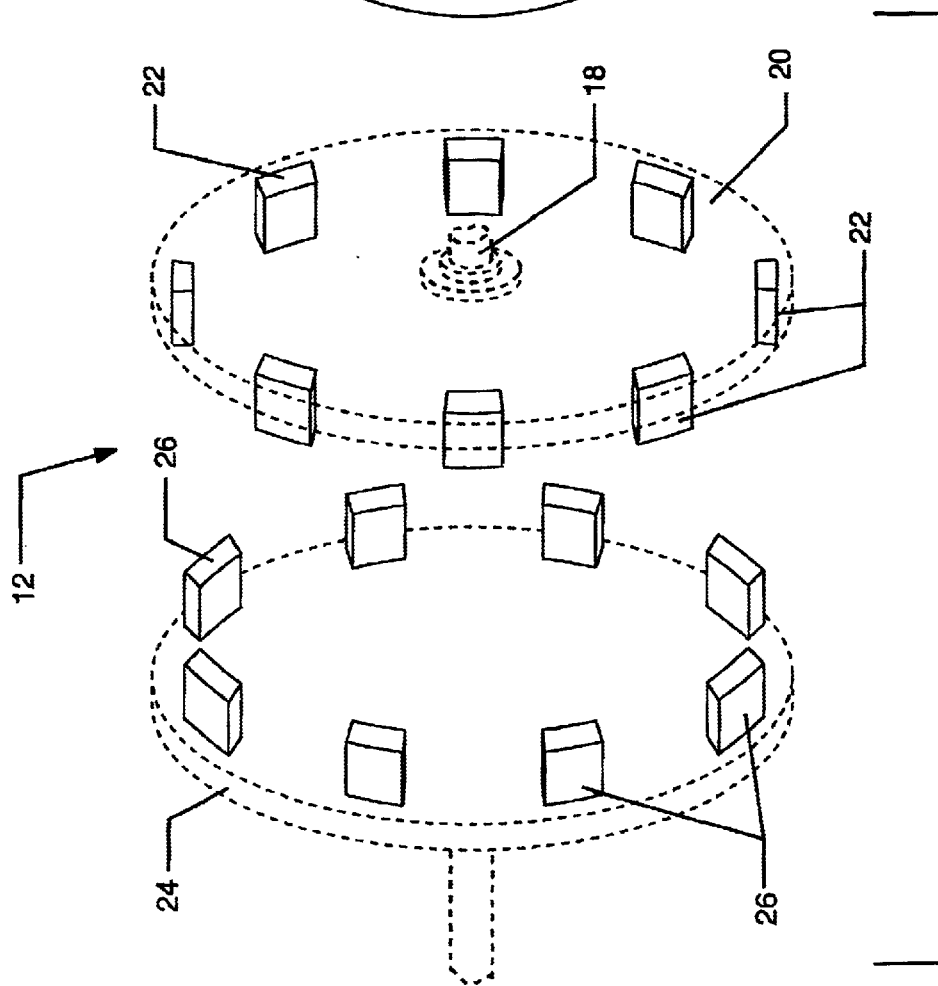

US 6,700,263 B1

ELECTRICAL GENERATING SYSTEM HAVING A MAGNETIC COUPLING

BACKGROUND OF THE INVENTION

The present invention generally relates to electrical generating systems. More particularly, the present invention relates to an electrical generating system utilizing a magnetic coupling arrangement.

Electrical generating systems are useful in a number of applications. Such electrical generating systems can comprise hydro-electric turbines, wind powered generating devices, or even solar panel arrays. With respect to solar panel arrays, there is often a need to convert the direct current electricity generated from the solar panel array into mechanical motion, or alternating current.

Accordingly, there is a need for an electrical generating system for producing electricity. Such an electrical generating system should have the capability of converting a direct current, such as from a solar panel array, to an alternating current or mechanical movement. The present invention fulfills these needs and provides other related advantages.

SUMMARY OF THE INVENTION

The present invention resides in an electrical generating system which generally comprises an electric motor coupled to a power source. In a particularly preferred embodiment, the power source comprises a solar panel array. A magnetic coupling is connected to an output shaft of the motor. In turn, a gear assembly is connected to the magnetic coupling.

The magnetic coupling comprises opposed first and second plates, each having permanent magnets affixed thereto. More particularly, the first plate is connected to the output shaft of the motor and includes radially positioned, spaced apart permanent magnets extending from a face thereof. The second plate is in spaced relation to the first plate and also includes radially positioned, spaced apart permanent magnets extending therefrom. The first and second plates are positioned such that the permanent magnets extend between one another, whereby a rotation of the first plate by the motor causes the second plate to rotate by repulsive magnetic force.

In a particularly preferred embodiment, the gear assembly comprises a first gear rotatably connected to the magnetic coupling and rotatably engaged with the second gear of a smaller diameter. The second gear is rotatably engaged with the third gear having a larger diameter than the second gear. The third gear is in operable connection with a gear of an electrical generator having a smaller diameter than the third gear. The third gear may also be attached to a propeller or the like. As such, the gear assembly has a high transmission ratio, typically at least 100 to 1. In a particularly preferred embodiment, a second electrical generator is connected to the third gear of the gear assembly.

The electrical generator is electrically coupled to the motor and/or an electrical outlet for delivering the electricity generated therefrom.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 2 is a perspective view of a magnetic coupling used in accordance with the present invention;

FIG. 3 is a schematic view of permanent magnets of each plate of the magnetic coupling, illustrating the staggered alignment thereof.

DETAILED DESCRIPTION OF THE PREFERRED EMBODIMENT(S)

As shown in the accompanying drawings for purposes of illustration, the present invention resides in an electrical generating system, generally referred to by the reference number 10. A particularly unique feature of the present invention is the utilization of a magnetic coupling 12, as will be described more fully herein.

Figure 1:
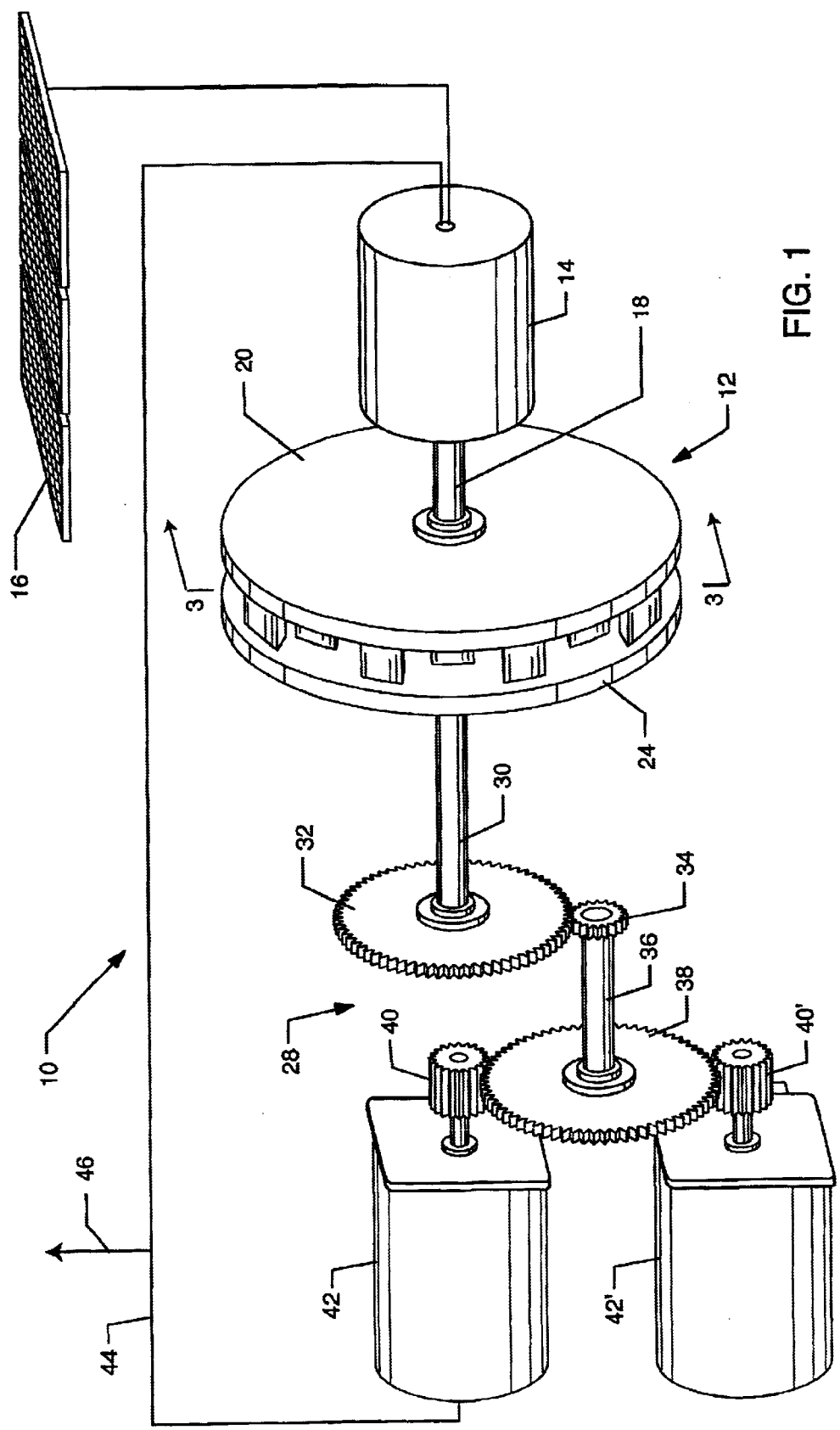
FIG. 1 is a perspective view of an electrical generating system embodying the present invention.
Figure 4:
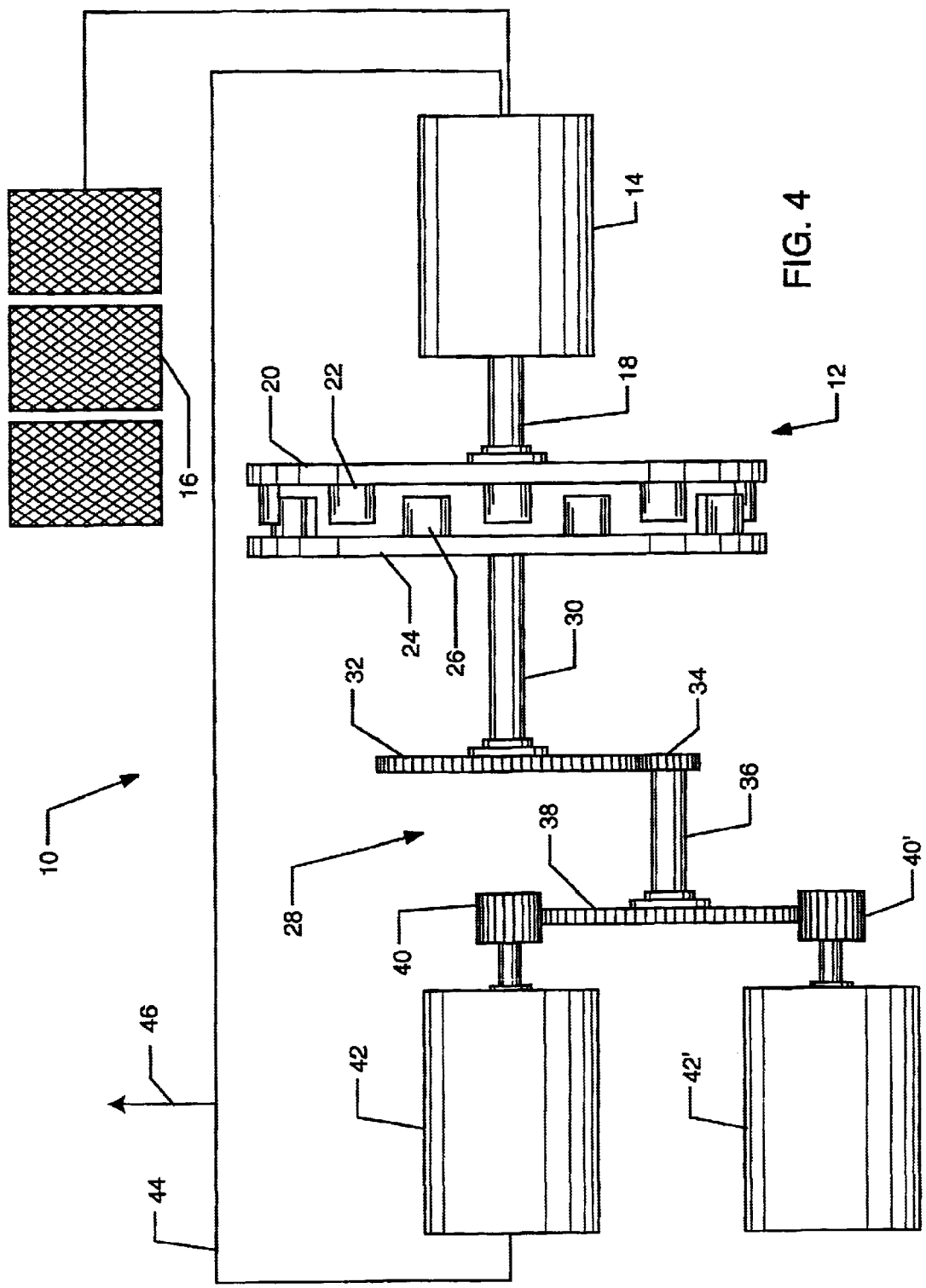
FIG. 4 is a side elevational view of the electrical generating system of the present invention, illustrating the staggered relationship of the magnets of the magnetic coupling.

With reference to FIG. 1, an electric motor 14 is provided to rotate the magnetic coupling 12. The motor 14 may comprise a ½ to 1 horsepower, 450 to 900 watt motor. A power source is provided to power the motor. In a particularly preferred embodiment, as illustrated, the power source comprises a solar panel array 16 or battery capable of generating sufficient electricity to power the motor 14.

With continuing reference to FIG. 1, the motor 14 may include a single output shaft 18, or multiple shafts. A first plate 20 of the magnetic coupling 12 is connected to the output shaft 18 of the motor 14. As shown in FIG. 2, the plate 20 Includes a plurality of permanent magnets 22 extending from a surface thereof generally opposite the motor 14 and in spaced relationship to one another. A second plate 24 of the magnetic coupling 12 also includes a plurality of permanent magnets 26 extending from a surface thereof and spaced apart from one another. The second plate 24 is positioned adjacent to the first plate 20 in a spaced relationship such that the magnets 22 and 26 of each plate 20 and 24, respectively, are generally aligned with one another in staggered and radial formation. The magnets 22, 26 should be positioned as far from the axis of the output shaft 18 as possible. Indeed, the coupling of the plates 20, 24 can be effected in many different ways, provided the coupling connection is as far from the axis of the output shaft as possible.

With reference now to FIG. 3, the magnets 22 and 26 of the first and second plates 20 and 24 are shown in a preferred arrangement. It will be noted that the north poles of adjacent magnets 22 and 26 face one another, as do the south poles. Thus, as the motor 14 turns the first plate 20 via shaft 18, the second plate 24 of the magnetic coupling is rotated by the magnetic repulsive forces of the permanent magnets 22 and 26. Preferably, the magnets 22 and 26 and plates 20 and 24 never contact one another during operation, the transmission of rotational energy being delivered through the magnetic repulsive forces of the aligned magnets 22 and 26.

A gear assembly 28 is connected to the second plate 24 of the magnetic coupling 12. In a particularly preferred embodiment, a shaft 30 extends from the second plate 24 to a tooth gear 32. This first gear 32 rotates in a 1:1 relationship with the second plate 24. The first gear 32 is rotatably engaged with a much smaller second gear 34. Preferably, the second gear 34 is ⅟10 the diameter of the first gear 32 such that it rotates through ten revolutions for each revolution of the first gear 32. A shaft 36 extends between the second gear 34 and a third gear 38 having a larger diameter than the second gear 34. However, due to the fact that the second and third gears 34 and 38 are interconnected with shaft 36, they rotate on a 1:1 relationship. Thus, for each revolution of the second plate 24 of the magnetic coupling 12, the third gear 38 rotates ten times. The third gear 38 is rotatably engaged with a gear 40 or 40' of an electrical generator 42 or 42'. Preferably, there is at least a 10:1 relationship between a third gear 38 and the electrical generator gear 40 so that the transmission effect of the gear assembly 28 is at least 100:1. In a particularly preferred embodiment, there is a 10.8:1 relationship between the third gear 38 and electrical generator gears 40 and 40'. Thus, for each rotation of the magnetic coupling 12, the electrical generator gear rotates through 108 revolutions.

In a particularly preferred embodiment, two electrical generators 42 and 42' are connected to the gear assembly 28. These electrical generators can comprise 4,000 watt generators. The generators 42 and 42' are connected via electrical leads 44 to the motor 14 and/or an electrical outlet 46. It is well-known in the art that a solar panel array will produce direct current electricity, whereas an electrical generator will produce alternating current.

Instead of connecting the gear assembly 28 to electrical generators 42, the invention contemplates the connection of a propeller or wheel to perform mechanical functions. Thus, the electricity from the solar panel array 16, or other power source, is transferred into mechanical motion.

Although the present application illustrates a single magnetic coupling 12, gear assembly 28 and pertinent electrical generating attachments or the like, it should be understood by the reader that a motor 14 can comprise a multi-shaft motor wherein these components extend from either side of the motor 14, creating a mirror image of the above described system 10.

Although several embodiments have been described in detail for purposes of illustration, various modifications may be made without departing from the scope and spirit of the invention. Accordingly, the invention is not to be limited, except as by the appended claims.

What is claimed is:

1. An electrical generating system, comprising:
   an electric motor coupled to a power source;
   a magnetic coupling connected to an output shaft of the motor; and
   a gear assembly connected to the magnetic coupling;
   wherein the magnetic coupling comprises opposed first and second plates each having permanent magnets affixed thereto, wherein the first plate is connected to the output shaft of the motor and includes radially positioned, spaced apart permanent magnets extending therefrom, and the second plate is in spaced relation to the first plate and includes radially positioned, spaced apart permanent magnets extending therefrom so as to extend between the permanent magnets of the first plate, whereby the rotation of the first plate by the motor causes the second plate to rotate by repulsive magnetic force.

2. The system of claim 1, including an electrical generator connected to the gear assembly.

3. The system of claim 2, wherein the gear assembly comprises a first gear rotatably connected to the magnetic coupling and rotatably engaged with a second gear of smaller diameter, the second gear being rotatably engaged with a third gear having a larger diameter than the second gear, the third gear in operable connection with a gear of the electrical generator having a smaller diameter than the third gear.

4. The system of claim 3, wherein the gear assembly has a high transmission ratio.

5. The system of claim 4, wherein the transmission ratio from the first gear to the third gear is at least 100 to 1.

6. The system of claim 3, including a second electrical generator connected to the third gear of the gear assembly.

7. The system of claim 2, wherein the electrical generator is electrically coupled to an electrical outlet.

8. The system of claim 1, wherein the power source comprises a solar panel array.

9. An electrical generating system, comprising:
   an electric motor coupled to a power source;
   a magnetic coupling connected to an output shaft of the motor and including opposed first and second plates each having permanent magnets affixed thereto, wherein the first plate is connected to the output shaft of the motor and includes radially positioned, spaced apart permanent magnets extending therefrom, and the second plate is in spaced relation to the first plate and includes radially positioned, spaced apart permanent magnets extending therefrom so as to extend between the permanent magnets of the first plate, whereby the rotation of the first plate by the motor causes the second plate to rotate by magnetic force;
   a gear assembly connected to the magnetic coupling; and
   an electrical generator connected to the gear assembly.

10. The system of claim 9, wherein the gear assembly comprises a first gear rotatably connected to the magnetic coupling and rotatably engaged with a second gear of smaller diameter, the second gear being rotatably engaged with a third gear having a larger diameter than the second gear, the third gear in operable connection with a gear of the electrical generator having a smaller diameter than the third gear.

11. The system of claim 9, wherein the gear assembly has a high transmission ratio.

12. The system of claim 11, wherein the transmission ratio from the first gear to the third gear is at least 100 to 1.

13. The system of claim 9, including a second electrical generator connected to the gear assembly.

14. The system of claim 9, wherein the power source comprises a solar panel array or battery.

* * * * *